United States Patent
Jalava

(10) Patent No.: US 11,614,577 B1
(45) Date of Patent: Mar. 28, 2023

(54) DUAL-COLOR FRONTLIT DISPLAYS WITH NEAR UNIFORM COLOR MIXING

(71) Applicant: Amazon Technologies, Inc., Seattle, WA (US)

(72) Inventor: Juho Ilkka Jalava, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/878,028

(22) Filed: May 19, 2020

Related U.S. Application Data

(62) Division of application No. 15/490,808, filed on Apr. 18, 2017, now Pat. No. 10,725,230.

(51) Int. Cl.
*F21V 8/00* (2006.01)
*H05B 45/20* (2020.01)

(52) U.S. Cl.
CPC ......... *G02B 6/0061* (2013.01); *G02B 6/0036* (2013.01); *G02B 6/0068* (2013.01); *G02B 6/0073* (2013.01); *H05B 45/20* (2020.01)

(58) Field of Classification Search
CPC .. G02B 6/0058; G02B 6/0036; G02B 6/0226; G02B 6/0038; H05B 33/0857
See application file for complete search history.

(56) References Cited

U.S. PATENT DOCUMENTS

| | | | |
|---|---|---|---|
| 6,167,182 A | 12/2000 | Shinohara et al. | |
| 6,264,343 B1 * | 7/2001 | Miyashita | G06F 3/0412 |
| | | | 362/600 |
| 6,834,973 B2 | 12/2004 | Ohkawa et al. | |
| 7,195,389 B2 | 3/2007 | Parker et al. | |
| 7,325,959 B2 | 2/2008 | Tsai et al. | |
| 7,434,973 B2 | 10/2008 | Parker et al. | |
| 10,725,230 B1 | 7/2020 | Jalava | |
| 2008/0316744 A1 | 12/2008 | Hirota et al. | |
| 2011/0205759 A1 | 8/2011 | Kurata et al. | |
| 2012/0243259 A1 | 9/2012 | Zhou et al. | |
| 2014/0049723 A1 | 2/2014 | Ryu et al. | |
| 2014/0063853 A1 | 3/2014 | Nichol et al. | |

(Continued)

*Primary Examiner* — Eric T Eide
(74) *Attorney, Agent, or Firm* — Eversheds Sutherland (US) LLP

(57) ABSTRACT

Systems, methods, and computer-readable media are disclosed for dual-color frontlit displays with near uniform color mixing. In one embodiment, an example device may include a light emitting diode (LED) array that includes a first LED that emits light having a first color and a second LED that emits light having a second color, and a light guide that includes a surface having a first portion adjacent to the first LED and a second portion adjacent to the second LED. The first portion may include a first number of binary element surface features formed on the surface, and the second portion may include a second number of binary element surface features formed on the surface. The first number of binary element surface features may be substantially parallel to a first direction of light emitted from the first LED, and the second number of binary element surface features may be substantially parallel to a second direction of light emitted from the second LED, wherein the second direction is substantially perpendicular to the first direction.

16 Claims, 7 Drawing Sheets

(56) References Cited

U.S. PATENT DOCUMENTS

2014/0177276 A1\* 6/2014 Wang He ............ G02B 6/0036
362/619
2015/0185400 A1   7/2015 Lee et al.
2015/0309240 A1  10/2015 He et al.
2018/0246270 A1   8/2018 Di Trapani et al.

\* cited by examiner

DUAL-COLOR FRONTLIT DISPLAYS WITH NEAR UNIFORM COLOR MIXING

CROSS-REFERENCE TO RELATED APPLICATION(S)

This application is a divisional of U.S. Nonprovisional application Ser. No. 15/490,808 filed Apr. 18, 2017, which is hereby incorporated by reference in its entirety.

BACKGROUND

Electronic devices may include light emitting diodes (LEDs) used to illuminate displays. Some devices may be configured to illuminate displays in more than one color, such as a yellow color and a white color. To illuminate displays to different colors, some devices may use LEDs of the desired colors, such as a yellow LED and a white LED. However, the positioning and arrangement of the LEDs may cause some bleeding or crosstalk between the two colors, resulting in crosses or other visually perceptible patterns along, for example, an edge of the display. Such visually perceptible patterns or other display issues caused by different color LEDs may negatively impact a user experience and/or functionality of the device.

Figure 1:
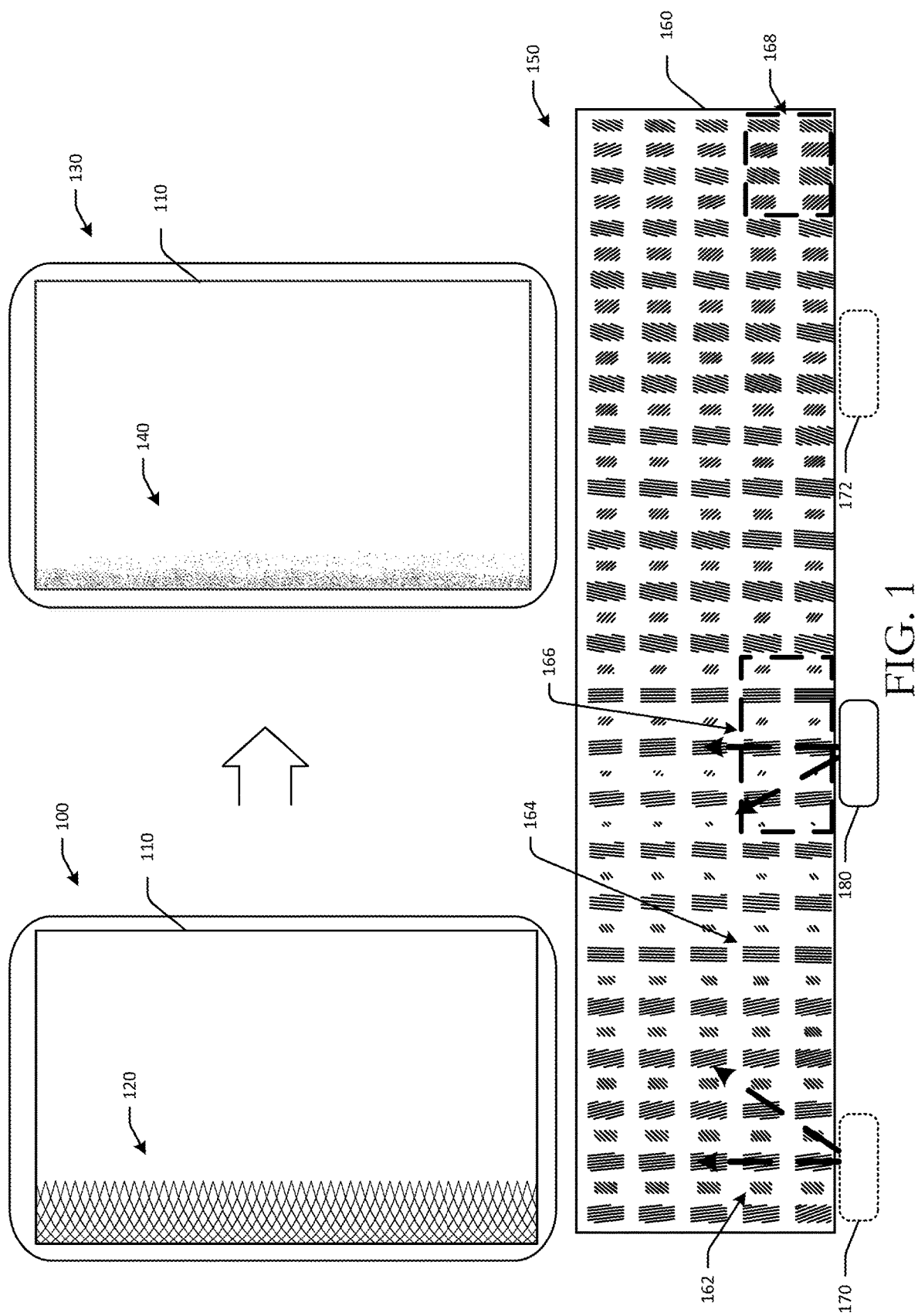
FIG. 1 is an example use case and schematic drawing of electronic devices with and without dual-color frontlit displays with near uniform color mixing in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume digital content. Some electronic devices may be configured to display or present digital content on a display device, such as a frontlit display device. A variety of devices, such as electronic book or e-reader devices, desktop computers, portable computers, smartphones, tablet computers, televisions, wearable devices, and so forth may be used to access various forms of content and other information. Display devices may be used to present content in one or more colors. In some instances, light emitting diodes (LEDs) of various colors may be used to render and/or present digital content on a display device. For example, an LED array with one or more LEDs may be used to emit light that propagates through a display stack causing an image or other content to be presented at the display device. Display stacks may include components such as, in one example, light guides, touch layers, capacitive sensors, cover layers or protective layers, and/or other components. The display stacks may be used as part of an electronic device to present content in one or more colors.

In some instances, display stacks that are used with multiple LED colors may produce crosstalk or a visually perceptible defect in lighting a portion of the display. For example, a display stack may be used with one or more white colored LEDs and one or more amber colored LEDs, or other LED colors, and a portion of the display area may have visually perceptible light emission from the respective LEDs that at least partially overlaps. Specifically, in one example, adjacent to the LEDs, the display may appear to have patterns in an "X" shape or a similar shape that can be perceived by a user of the device. The patterns or other interference between the light of the LEDs may be the result of poor or non-uniform mixing of light along the edge or along a side of the device, for example, one of the sides at which the LEDs are positioned. Such crosstalk or interference between the light emitted by the respective LEDs may negatively impact the user experience of the device, and may negatively impact functionality of the device. For example, the user may be unable to, or may have difficulty, reading content along an affected edge or side of the display.

Display stacks may be dimensioned so as to fit within a device or display housing. In some instances, display stacks may be used with borderless housings, such that the display stack does not have a border or bezel around a perimeter of the display stack, thereby increasing a viewable area of the display stack. Accordingly, while some devices may use a border or bezel to cover up or otherwise hide the portion of the display that may be susceptible to visually perceptible poor mixing of light, devices that have increased viewability or that include relatively small or no borders may be at risk of exposing a portion of the display with poor light mixing.

Embodiments of the disclosure may include displays that provide uniform, or near uniform, mixing of light from multiple LEDs that have one or more colors. Accordingly, displays can be used without borders or other techniques used to hide or mask a portion of the display, because embodiments of the disclosure may provide near uniform mixing of light at displays near or adjacent to the LEDs. Some embodiments include light guides with specific patterned surface features that direct and/or cause light of a certain LED to be propagated in one or more directions, so as to achieve improved light and color mixing of light emitted by the respective LEDs. As a result, uniform or near uniform light mixing may be achieved, and visibility and/or functionality of the display may be improved.

This disclosure relates to, among other things, systems, methods, computer-readable media, techniques, and methodologies for dual-color frontlit displays with near uniform color mixing. Embodiments may include displays that improve and/or increase mixing or blending of light emitted by one or more LEDs of various colors, so as to improve viewability and/or a useful space of a display. Certain embodiments may reduce or remove visually perceptible defects or patterns that appear on a display as a result of crosstalk or interference between incident light emitted by the respective LEDs. In some embodiments, devices may use dual-color LEDs instead of single color LEDs, without increasing a size or footprint of the device. Certain embodiments may create uniform or near uniform lighting distribution at one or more sides or edges of displays along the edges of the display, while at the same time providing dual-color functionality without, in some instances, making structural changes to display stacks.

Referring to FIG. 1, an example use case and schematic drawing of electronic devices with and without dual-color frontlit displays with near uniform color mixing are depicted in accordance with one or more embodiments of the disclosure. A first device 100 may be a device that does not include a dual-color frontlit display with near uniform color mixing. A second device 130 may be a device that includes a dual-color frontlit display with near uniform color mixing in accordance with one or more embodiments of the disclosure. The first device 100 and/or the second device 130 may be any suitable electronic device, such as a smartphone, a tablet, an audio or video streaming device, an e-reader device, an Internet of Things (IoT) device, a product ordering button or device, a speaker device, or another device. In the example of FIG. 1, the first device 100 and the second device 130 may be e-reader devices with dual-color functionality. Dual-color functionality may allow the respective devices to change front light colors. For example, the front light may be changed to an amber color for a nighttime mode of the device, and to a cool white color for a daytime mode of the device. The color of the display may be modified by modifying the performance and/or activation of one or more LEDs. Other colors and combinations may be used. For dual-color functionality, one or more LED arrays may be used. For example, a first LED array may be used for the amber color, and a second LED array may be used for the cool white color.

As illustrated in FIG. 1, the first device 100 may include a display 110 that may be used to present content. However, along an edge or a side, or another portion, of the display 110, there may be visually perceptible crosstalk 120 or interference between light emitted by different LEDs. The crosstalk 120 may take the form of an "X" like shape or rays of light that intersect and/or interfere with each other. The pattern or other visually discernible defect may interfere with readability and/or functionality of the first device 100.

The second device 130, however, may include a display 110 with the same dimensions as the display of the first device 100, but may have a uniform or near uniform light distribution and/or color mixing 140 along an edge or side, or another portion, of the display 110. The edge or side of the display may be the edge or side that is adjacent to one or more LED arrays of the respective first device 100 and the second device 130. The second device 130 may therefore have a dual-color frontlit display that maintains a device form factor and dimensions, but has uniform or near uniform light distribution and/or color mixing, so as to avoid the crosstalk 120 or other visual defects, such as that shown at the display of the first device 100.

To achieve the uniform or near uniform light distribution and/or color mixing, the second device 130 may include a light guide 150 that may be a part of a display stack of the second device 130. The light guide 150 may have a front light pattern formed on one or more surfaces of the light guide 150 that is configured to extract light from one or more LEDs towards the display. The front light pattern may be arranged so as to extract light from LEDs of a first color from a first LED array, such as amber, in substantially the same amount as light extracted from LEDs of a second color from a second LED array, such as cool white. As a result, LEDs of both colors can light up the device display almost equally or equally, resulting in uniform or near uniform illumination.

The light guide 150 may have a front light pattern formed by one or more surface features on a surface of the light guide 150. For example, the surface features may include binary elements or raised protrusions extending from a surface (or negative surface features, such as grooves, slots, blind holes, or other negative surface features that extend into the surface) of the light guide 150. The raised protrusions or binary elements may have a rectangular cross-sectional geometry, a box-like structure, a rectangular bar-shaped formation, or another form factor. In some embodiments, the raised protrusions may be cylindrically shaped dots, elliptically or oval-shaped protrusions, or other form factors. Some embodiments may include combinations of various types or shapes of surface features. The surface features may be formed in certain patterns, such as a grating pattern, a random pattern, a rectangular pattern, or another arrangement.

For example, in FIG. 1, a portion 160 of the light guide 150 is depicted in a top view. The portion 160 may have a number of binary elements or surface features formed on a surface of the light guide 150. The portion 160 may represent the first 10-20 millimeters of the display adjacent to the LEDs. In some embodiments, the portion 160 may be an active area of a light guide, and may be spaced a distance from the LEDs. For example, the active area may be about 8 millimeters from the LEDs. The portion 160 of the light guide 150 may be positioned adjacent to a number of LEDs. For example, the portion 160 may be positioned adjacent to a first LED 170 that emits light of a first color, a second LED 180 that emits light of a second color, and a third LED 172 that emits light of the first color. LEDs that emit light of the second color may be interlaced or placed between the LEDs of the first color, so as to form an alternating arrangement of LEDs of the first color and the second color. In some embodiments, one LED color may have an odd number of LEDs and another LED color may have an even number of LEDs. The LEDs may be part of one or more LED arrays with LEDs arranged in an alternating color arrangement. The LED array may be optically coupled to the light guide 150. While illustrated with certain relative positioning between the surface features and LEDs in FIG. 1, the illustrated embodiment is an example and other embodiments may have different positioning and/or arrangements between LEDs and the surface features. The dashed lines of the first LED 170 and the third LED 172 indicate that, in some embodiments, the first LED 170 and/or the second LED 172 may be positioned elsewhere.

The binary elements arranged on the surface of the portion 160 may be arranged in sections in a grating pattern.

For example, the sections of binary elements may be separated by gaps of empty space in between sections of binary elements. The gaps of empty space may be portions of the light guide that are devoid of any surface features. Some of the sections may be formed in a grating pattern and/or as grating pixels.

The arrangement and/or orientation of the respective sections of surface features, or binary elements as depicted in FIG. 1, may correspond to an LED for which the section of binary elements is configured to extract light from. For example, binary elements in a section may be aligned to be perpendicular or substantially perpendicular to light emitted from an LED for which the section is configured to extract light from. Specific angles or orientations for individual binary elements or sections of binary elements may be determined based at least in part on the binary element or section spatial location on the light guide. The binary elements may have different light extraction properties depending on the direction and orientation at which light impinges on the binary elements. For example, light that impinges perpendicular to a binary element may be extracted, while light that impinges in a direction parallel to the binary element may not be extracted, or may be extracted less than light that impinges at a perpendicular angle.

Dimensions of individual binary elements or sections of binary elements may be based at least in part on spatial positioning of the binary element and/or section. For example, binary elements (or sections of binary elements) in between two different colored LEDs may be relatively larger in one or more dimensions than binary elements (or sections of binary elements) that are closer to one color of LED than another color. As a result, light extraction between the LEDs may be more uniform than light extraction near a specific color of LED, which may favor or be more sensitive to light extraction for that specific color of LED.

The angle and/or orientation of surface features, such as binary elements or sections of binary elements, may be determined based at least in part on an angle of light emission or emitted from an LED that the binary elements are configured to extract light from, or prefer to extract light from, as well as a spatial positioning or distance between the LED and the binary elements. A first set of binary elements or sections of binary elements may be mapped at a specific orientation or angles that correspond to light emitted from a first LED, while a second set of binary elements or sections of binary elements may be mapped at a specific orientation or angles that correspond to light emitted from a second LED. At portions where the first set and the second set of binary elements overlap, the positioning and/or dimensions of the binary elements may be modified so as to accommodate light extraction from both the first LED and the second LED.

The angle and/or orientation of binary elements may affect extraction of ambient LED light. For example, LED light that impinges on a binary element at a perpendicular or near perpendicular direction may be extracted more efficiently than LED light that impinges at an angle that is closer to a parallel direction. By arranging and/or orienting the binary elements in a front lighting pattern, light may be extracted and/or the display can be illuminated uniformly or nearly uniformly (e.g., about 90% uniform, about 95% uniform, etc.) at the area adjacent to the LEDs by both LED colors, such as amber and cool white LED arrays.

In FIG. 1, a first section 162 of binary elements may be arranged so as to couple or extract light from the first LED 170. The first section 162 may therefore have binary elements in a grating pattern that are oriented so as to be perpendicular to light that is emitted from the first LED 170. As shown in FIG. 1, the first LED 170 may emit light in a number of directions, and the first section 162 of binary elements may be oriented to be perpendicular or substantially perpendicular to light emitted by the first LED 170. The first section 162 may also include binary elements that are arranged so as to be parallel to, or substantially parallel to, a direction of light emitted by the first LED 170. This may be so that such binary elements are less sensitive to coupling light from the first LED 170, and more sensitive to light from the second LED 180 (e.g., light from the second LED 180 impinges these binary elements at closer to a perpendicular angle than light from the first LED 170, etc.), so as to improve mixing of light from the second LED 180 in front of, or otherwise near, the first LED 170.

A second section 164 of binary elements may be positioned relatively in middle of the first LED 170 and the second LED 180. Accordingly, the second section 164 may be angled or oriented so as to extract or couple light from both the first LED 170 and the second LED 180. The second section 164 may therefore have binary elements that are relatively straight or perpendicular to an edge or side of the portion 160 at which the LEDs are positioned.

A pattern density of binary elements may also be modulated or adjusted to affect coupling or extraction of light. For example, a first pattern density 166 adjacent to a particular LED, such as the second LED 180 may include a relatively heavy pattern density for binary elements that are configured to extract light from the second LED 180, while including a relatively light pattern density for binary elements that are configured to extract light from the first LED 170. The pattern density for binary elements that favor light from a first LED may be relatively higher near the first LED than a pattern density for binary elements that favor light from a second LED near the first LED.

A second pattern density 168 for binary elements that are not spatially closer to a specific LED, or are otherwise positioned near a middle or in between two LEDs, may be relatively higher for both binary elements that favor a first LED and a second LED. Accordingly, pattern density for both sets or groups of binary elements (e.g., groups of binary elements that favor extraction of one color over another, etc.) may be relatively higher for locations that are not near a specific LED color. Pattern density of a pattern particular to an LED may increase as a distance between the pattern portion and the specific LED decreases. Near the middle of two LEDs, the pattern densities may be the same or almost the same.

Angle maps, or orientations for binary elements or sections of binary elements, may be determined individually for respective LEDs, and combined to form a blended angle map. In some embodiments, there may not be any overlap between the individual angle maps, while in other embodiments, there may be an overlap between the individual angle maps. As a result, some embodiments may have blended and/or imperfect angle maps that are optimized for both LED colors, and not for any one specific LED color.

As a result, performance or functionality of the device and/or display may be improved, and visually perceptible interference and/or undesirable light patterns may be prevented, while allowing dual-color functionality Light distribution and/or color mixing of light of different colors may be improved and may be uniform or near uniform, particularly in areas adjacent to one or more LEDs. Certain embodiments may create uniform or near uniform light mixing while maintaining device form factor and avoiding borders or bezels used to cover a portion of the display.

Certain embodiments may therefore increase viewability and/or usable display space for devices.

Example embodiments of the disclosure provide a number of technical features or technical effects. For example, in accordance with example embodiments of the disclosure, certain embodiments of the disclosure may include light guides with surface features formed in particular patterns that can extract light in a near uniform or uniform manner from LEDs of different colors. Certain embodiments may therefore allow for devices to increase an amount of usable display space and/or improve viewability of portions of a display. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
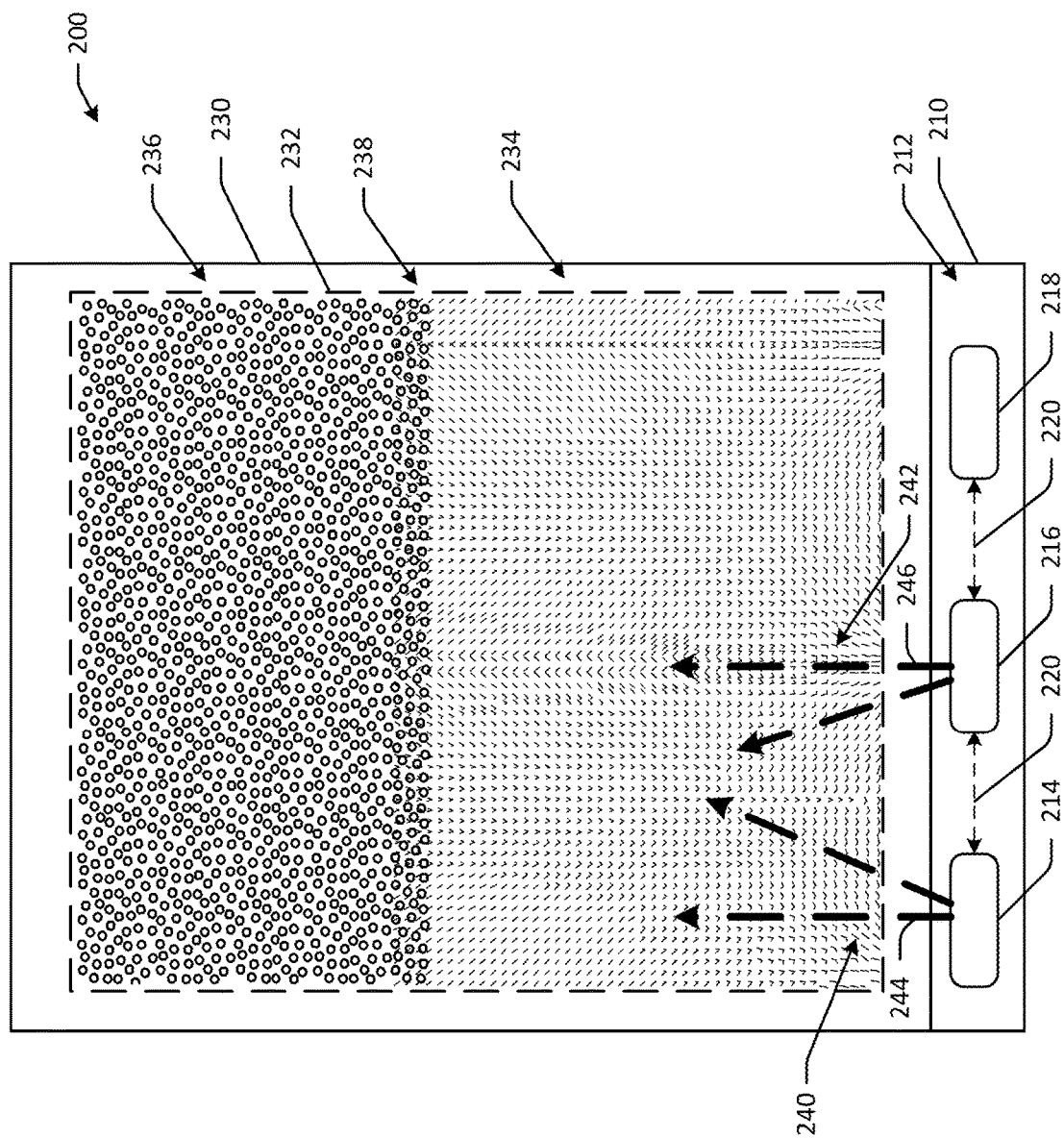
FIG. 2 is a schematic drawing of a light guide with surface features and a light emitting diode (LED) array in accordance with one or more embodiments of the disclosure.

Referring to FIG. 2, a schematic drawing of a top view of a light guide 200 with surface features and a dual-color LED array 210 is depicted in accordance with one or more embodiments of the disclosure. The light guide 200 may be optically coupled to the LED array 210. The LED array 210 may include LEDs having at least two different colors. The LEDs may be positioned in a single row 212 in some embodiments. The LEDs may be arranged in an alternating arrangement in some embodiments. For example, the LED array 210 may include a first LED 214 having a first color, a second LED 216 having a second color, and a third LED 218 having the first color, and so forth. The first color may be an amber white color and the second color may be a cool white color. An amber white color may represent a yellowish, candle-like color that may correspond to, for example, a nighttime reading mode, while a cool white color may correspond to a paper white color, a sunlight-like color, or another white color with medium to high brightness. Additional or fewer LEDs, additional rows of LEDs, and/or LEDs of different colors may be included in different embodiments. The first LED 214 may be separated from the second LED 216 by a distance 220, which may be, in one example, about 6 millimeters. The second LED 216 may be separated from the third LED 218 by the distance 220.

The light guide 200 may have a surface 230 with one or more surface features formed on the surface 230. The surface 230 may be facing an electrophoretic component of a device or another surface. The light guide 200 may include an active area 232 on the surface 230. The active area 232 may be formed slightly inset of a perimeter of the surface 230. For example, the active area 232 may be about 5 millimeters or about 10 millimeters from the LEDs of the LED array 210.

The active area 232 may have one or more surface features formed on the surface 230. For example, a number of binary elements 234 may be formed on a portion of the surface 230 adjacent to the LED array 210, and a number of cylindrical elements 236 or cylindrical surface features may be formed adjacent to the binary elements 234. The surface features may overlap or may be interspersed in a blended region 238 between the binary elements 234 and the cylindrical elements 236. In the blended region 238, the surface features may transition from the binary elements 234 to the cylindrical elements 236 as a distance from the LED array 210 increases. The transition may be a gradual and/or smooth transition between the surface features. The blended region 238 may have a distance or width of several centimeters of the display.

The light guide 200 may have a first portion 240 that is adjacent to the first LED 214 and a second portion 242 that is adjacent to the second LED 216. The first portion 240 may include a number of binary element surface features or binary elements formed on the surface 230, and the second portion 242 may include a number of binary element surface features or binary elements formed on the surface 230.

The binary elements of the first portion 240 may be at least partially substantially aligned with (which could be parallel to, or substantially parallel to, in one example) a first direction of light 244 emitted from the first LED 214, and the binary elements of the second portion 242 may be at least partially aligned with a second direction of light 246 from the second LED 216. Alignment may indicate that the binary element is positioned parallel to, or substantially parallel to, the direction of light. As a result, light from the first LED 214 may not be coupled (or a minimal amount of light from the first LED 214 may be coupled) by the binary elements of the first portion 240, and light from the second LED 216 may be coupled by the binary elements of the first portion 240, thereby increasing mixing of light and uniformity. Similarly, light from the second LED 216 may not be coupled (or a minimal amount of light from the second LED 216 may be coupled) by the binary elements of the second portion 242, and light from the first LED 214 may be coupled by the binary elements of the second portion 242, thereby increasing mixing of light and uniformity.

As light from the LEDs propagates through the binary elements 234, light mixing of the first color light and the second color light may be increased due to the arrangement and orientation of the binary elements 234. As the light propagates through the binary elements 234 to the blended region 238, the light may impinge the cylindrical surface features and propagate to the cylindrical elements 236, where the light color mixing may be uniform at a certain distance from the LED array 210. The number of binary elements 234 may gradually decrease towards a middle of the surface 230, such as in the blended region 238, while the number of cylindrical elements 236 may gradually increase, which may result in constant illumination of the entire display.

Figure 3:
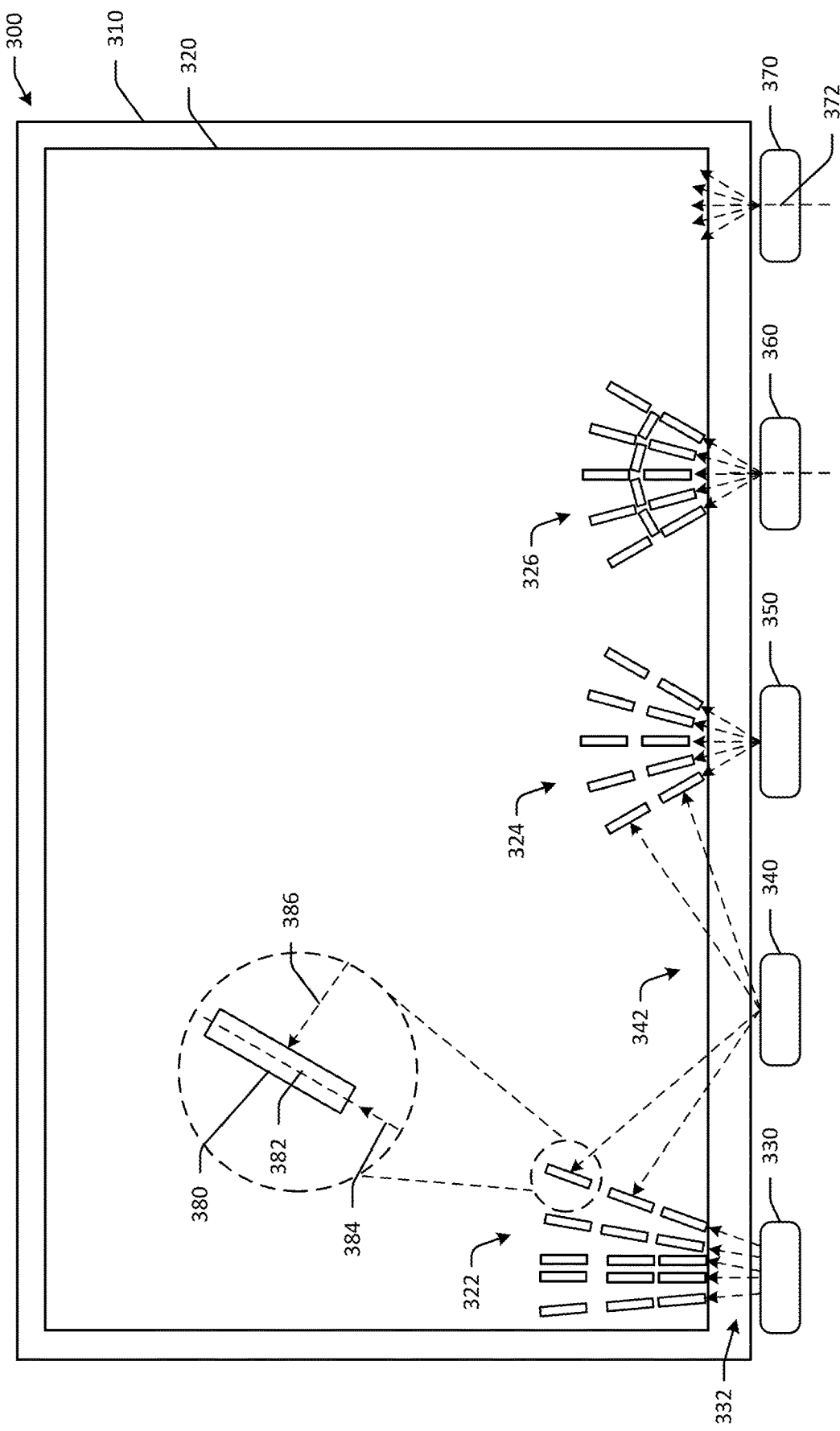
FIG. 3 is a schematic drawing of an example arrangement of binary element surface features on a light guide surface in accordance with one or more embodiments of the disclosure.

FIG. 3 schematically depicts an example embodiment 300 with an arrangement of binary element surface features on a light guide surface in accordance with one or more embodiments of the disclosure. A light guide 310 may include a front light pattern area or an active area 320 on a portion of a surface of the light guide 310. The front light pattern or active area 320 may be dimensioned so as to be slightly separated from edges of the light guide 310.

The light guide 310 may be optically coupled to one or more LEDs and/or one or more dual-color LED arrays. For example, the light guide 310 may be optically coupled to a first LED 330, a second LED 340, a third LED 350, a fourth LED 360, a fifth LED 370, and so forth. The first LED 330, the third LED 350, and the fifth LED 370 may be configured to emit the same color light, such as a cool white light, while the second LED 340 and the fourth LED 360 may be configured to emit the same color light that is different than the color of light emitted by the other LEDs, such as an amber white light. The LEDs may be arranged in an alternating or interlaced color arrangement. Each of the LEDs may be configured to emit light. For example, the first LED 330 may emit light in a number of directions 332, and the second LED 340 may emit light in a number of directions 342.

The light guide 310 may include a number of surface features, such as binary elements and/or cylindrical elements, or a combination of multiple surface features, that are configured to extract or couple light emitted by the LEDs. For example, a first portion of binary elements 322 may be formed on the surface of the light guide 310 in the active area 320. While FIG. 3 depicts certain surface features in an example for illustration, additional or fewer surface features may be formed on the light guide 310 with different orientations and/or in a different arrangement, as well as with different dimensions.

The first portion of binary elements 322 may be oriented or angled so as to be aligned with one or more directions of light emitted by the first LED 330. As a result, the first portion of binary elements 322 may be oriented to be at least partially perpendicular to, or substantially perpendicular to, one or more directions of light emitted by the second LED 340. The binary elements in the first portion 322 may therefore couple more light of the second color from the second LED 340 than light of the first color from the first LED 330.

For example, as illustrated in detailed view in FIG. 3, light from the first LED 330 may be emitted in a first direction 384. The first direction 384 may be parallel to, or substantially parallel to, a central axis 382 of a binary element 380 in the first portion of the binary elements 322. The binary element 380 may therefore extract or couple a minimal amount of, or none of, the light from the first LED 330 in the first direction 384. The second LED 340, however, may emit light in a number of directions 342, which may include a second direction 386. The second direction 386 may be perpendicular to, or substantially perpendicular to, the central axis 382 of the binary element 380. As a result, light from the second LED 340 in the second direction 386 may be extracted or coupled by the binary element 380.

The binary element 380 may therefore be oriented at an angle so as to extract light from a certain LED. Angles of the binary elements or pattern elements may be defined based at least in part on spatial location on the light guide surface, as well as whether the particular element or group of elements is configured to minimize or maximize a particular color of light.

Similarly, a second portion 324 of binary elements may be arranged so as to align with light emitted from the third LED 350. As illustrated in the example of FIG. 3, the second portion 324 may extract light from the second LED 340, because the light from the third LED 350 may be substantially parallel to the binary elements.

While illustrated with binary elements that are aligned to the directions of light emitted by the third LED 350, some embodiments may include additional binary elements that are perpendicular to, or substantially perpendicular to, the directions of light emitted by an LED. For example, as shown adjacent to the fourth LED 360, binary elements 326 near the fourth LED 360 may include binary elements that are both parallel to and perpendicular to the light emitted by the fourth LED 360. As a result, color mixing may be improved.

In some embodiments, at least some binary elements adjacent to an LED may be aligned with a central axis of the LED. For example, the fifth LED 370 may have a central axis 372, and one or more binary elements near the fifth LED 370 may be oriented so as to be substantially parallel to, or parallel to, the central axis 372.

In some embodiments, some or all of the binary elements at the light guide surface may be negative surface features that extend into the light guide surface. For example, rather than being raised protrusions, the surface features may be grooves or slots instead of rectangular protrusions, or may be blind holes instead of cylindrical dots, and so forth.

Figure 4:
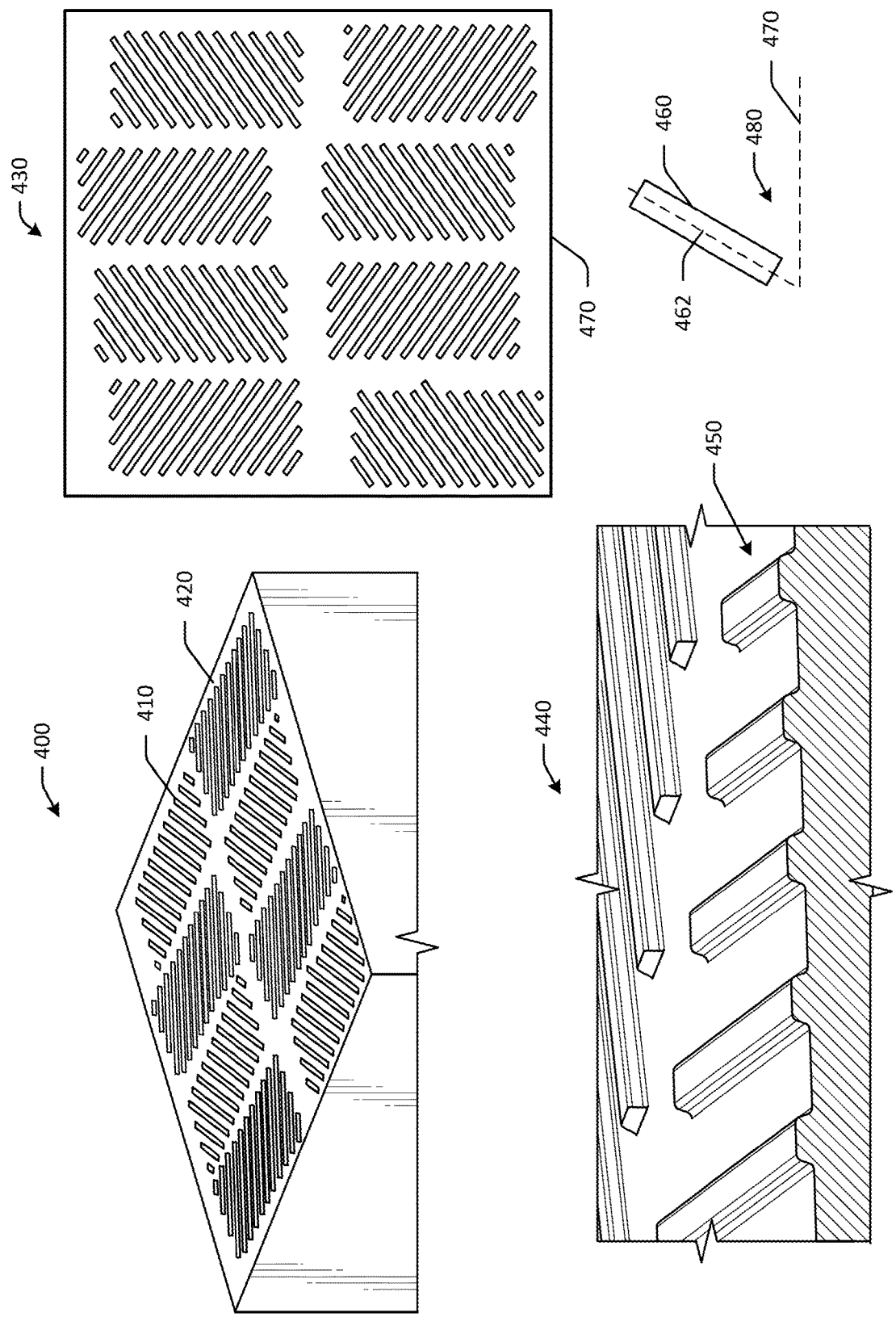
FIG. 4 is a schematic drawing of various views of binary element surface features in accordance with one or more embodiments of the disclosure.

FIG. 4 is a schematic drawing of various views of binary element surface features in accordance with one or more embodiments of the disclosure. In a perspective view 400, a portion of a light guide surface 420 with binary element surface features 410 is depicted. The light guide surface 420 is also depicted in a top view 430 and a cross-sectional view 440. As shown in FIG. 4, the binary element surface features 410 may be raised protrusions that extend from the light guide surface 420. The raised protrusions may be raised linear protrusions in that the binary elements have a linear or straight geometry. The binary element surface features 410 may be formed of the same material as the light guide, such as plastic or glass. Light that impinges on the binary elements may be propagated or coupled based at least in part on an angle of impingement. For example, light that impinges at a perpendicular angle, the amount of light coupled or propagated may be higher than light that impinges at an acute angle. The illustrated portion of the light guide face in FIG. 4 may have dimensions of, for example, about 0.4 millimeter by 0.4 millimeter. Light incident in the direction of the grating may have weak extraction, while light incident perpendicular or substantially perpendicular to the grating may have relatively strong extraction. The surface features 410 may be formed on an electrophoretic display side of the light guide.

The binary element surface features 410 may be arranged in sections or groups that may be substantially rectangular. For example, in the illustrated embodiment, the light guide surface 420 may include eight discrete portions or groups of binary element surface features. Some of the groups may correspond to one LED color, while other groups may correspond to another LED color. A pattern density of a group or section of binary elements may determine a size of the group or section. For example, a group with a relatively high pattern density may have greater length or width dimensions than a group with a relatively low pattern density. In some embodiments, the arrangement of the binary elements in a section or group may be in a grating arrangement, where individual binary elements within the section or group are spaced apart at equal or substantially equal distances and have the same or substantially the same angular orientation. In some embodiments, a gap of empty space may separate discrete sections or groups of binary elements. The gap size or width of a gap may be reduced by increasing a pattern density of one or more groups or sections, and may be increased by reducing a pattern density of one or more groups or sections. Pattern density may impact light extraction and crossover or bleeding between the colors.

As shown in the cross-sectional view 440, individual binary elements 450 may have a substantially rectangular cross-sectional geometry. Some embodiments may have fillets, curves, or other stress reducing features that may improve light propagation or coupling while also increasing structural integrity of the light guide. Individual binary elements may have different lengths, but may have the same widths and heights in some embodiments.

An orientation angle 480 for an individual binary element 460 may be determined by determining the angle 480 between a central axis 462 of the individual binary element 460 and an edge of the light guide 470, which may correspond to an X or Y planar axis of the light guide surface 420. The orientation angle 480 may be determined based at least in part on the LED color the individual binary element 460 is configured to favor or be more sensitive to, and a distance between the individual binary element 460 and the LED, as well as other LEDs, and/or a pattern density of the section or portion in which the individual binary element 460 is positioned. While depicted in separate drawings, some embodiments may include light guides having both the binary element surface features of FIG. 4 and the cylindrical surface features of FIG. 5.

Figure 5:
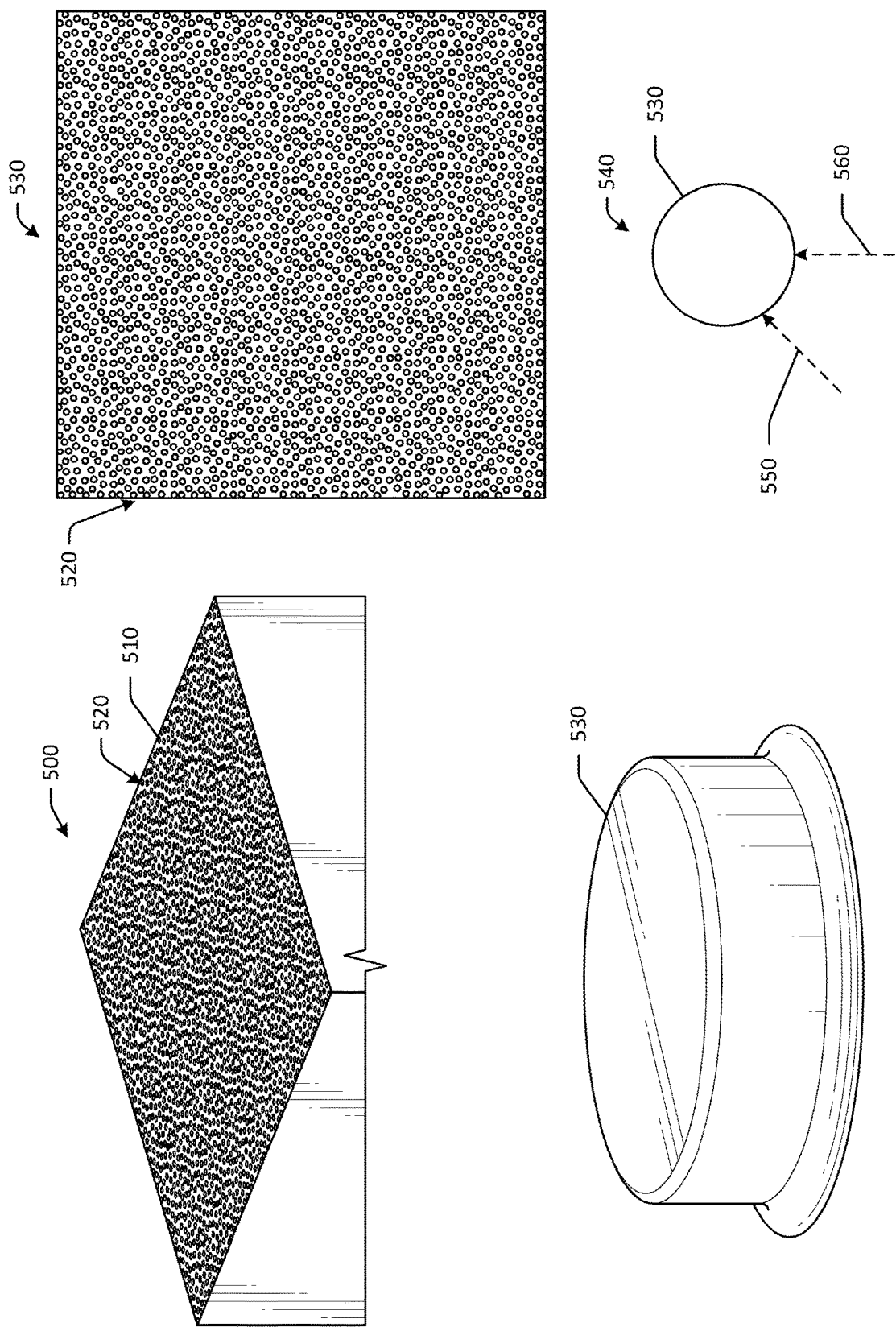
FIG. 5 is a schematic drawing of various views of cylindrical surface features in accordance with one or more embodiments of the disclosure.

FIG. 5 is a schematic drawing of various views of cylindrical surface features in accordance with one or more embodiments of the disclosure. In a perspective view 500, a portion of a light guide surface 510 with cylindrical surface features 520 is depicted. The light guide surface 510 is also depicted in a top view 540. The cylindrical surface features 520 may be arranged in a random pattern or may be arranged in a particular pattern. The cylindrical surface features 520 may be interspersed between one or more binary elements or groups of binary element surface features, such as those shown in FIG. 4. The cylindrical surface features 520 may be raised protrusions that extend from the light guide surface 510. The cylindrical surface features 520 may be formed of the same material as the light guide, such as plastic or glass. Light that impinges on the cylindrical surface features 520 may be propagated or coupled regardless of an angle of impingement. The illustrated portion of the light guide face in FIG. 5 may have dimensions of, for example, about 0.4 millimeter by 0.4 millimeter. Light incident to the surface feature may extract substantially equally from multiple, or all, directions. The cylindrical surface features 520 may be formed on an electrophoretic display side of the light guide.

In some embodiments, the cylindrical surface features 520 may be arranged in sections or groups that may be substantially rectangular. A pattern density of cylindrical surface features 520 may be modified so as to adjust or modulate light propagation across the light guide surface 510.

An individual cylindrical surface feature 530 is shown in perspective view. The individual cylindrical surface feature 530 may have one or more base portions and may be chamfered and/or include fillets or rounded corners so as to reduce stress and potentially improve light propagation or coupling while also increasing structural integrity of the light guide. Individual cylindrical surface feature(s) 530 may have the same or different diameters and/or heights. As shown in a top view 540, light that impinges on the individual cylindrical surface feature 530 from a first direction 550 may propagate or be extracted in an amount that is the same or substantially equal to an amount of light extracted from light that impinges on the individual cylindrical surface feature 530 from a second direction 560. Light propagation for the individual cylindrical surface feature 530 may be substantially equal regardless of light color and/or angle of impingement. As discussed above, some embodiments may include negative surface features, or surface features formed in the light guide surface that extend into, instead of away from, the light guide surface.

Figure 6:
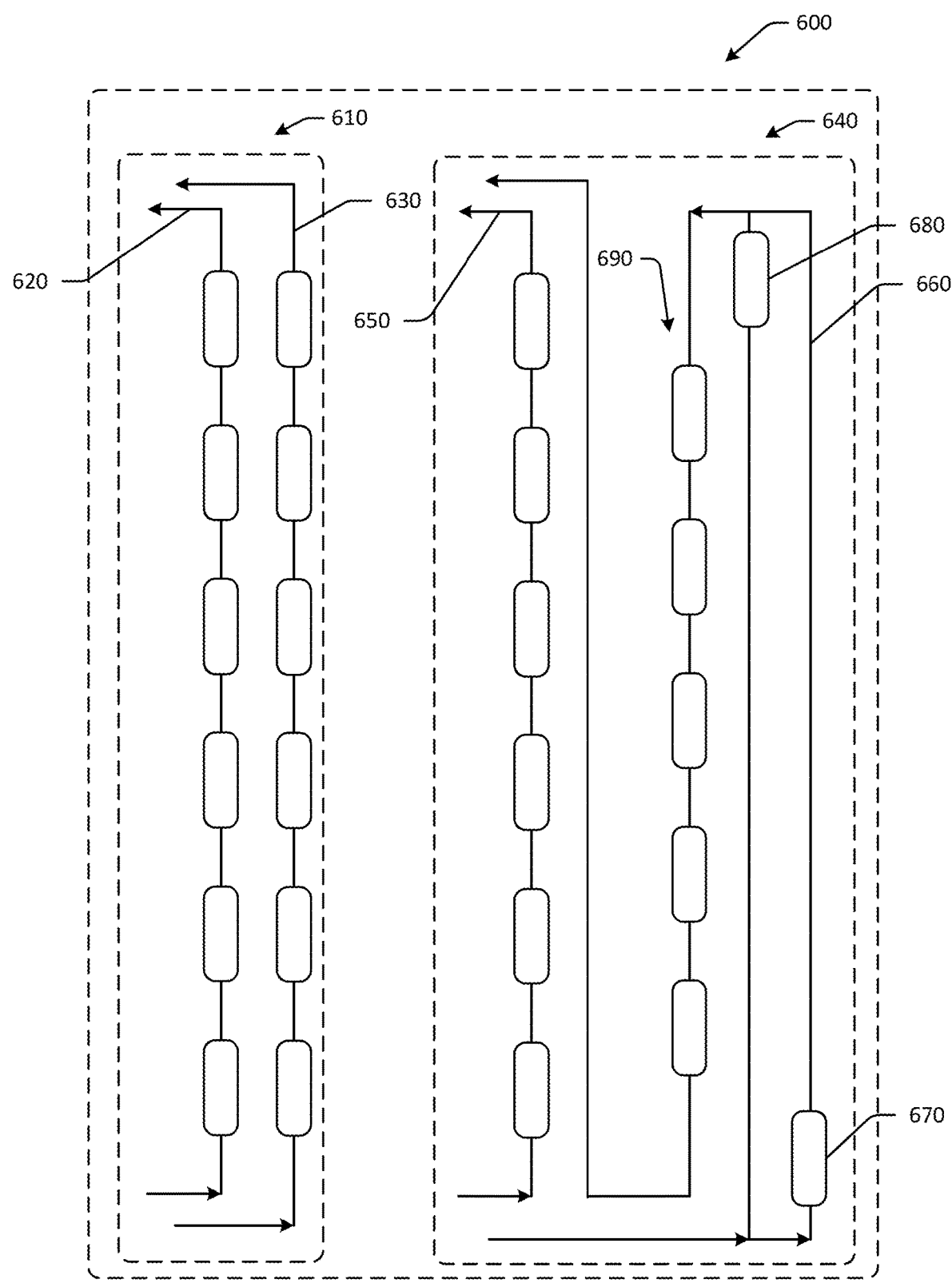
FIG. 6 is a schematic drawing of an example driving circuit for LEDs in dual-color frontlit displays with near uniform color mixing in accordance with one or more embodiments of the disclosure.

FIG. 6 is a schematic drawing of an example driving circuit 600 for LEDs in dual-color frontlit displays with near uniform color mixing in accordance with one or more embodiments of the disclosure. The driving circuit 600 may be a flexible printed circuit and may include one or more strings. For example, the driving circuit 600 may include a first set 610 of one or more strings that have LEDs of a first color. The first set 610 may include, in one example, two independent strings that each have six cool white LEDs. A first string 620 in the first set 610 may include six cool white LEDs connected in a series connection, and a second string 630 in the first set 610 may include six cool white LEDs connected in a series connection. The first string 620 may be separate or independent from the second string 630. Current provided to the individual LEDs in both the first string 620 and the second string 630 may be equal or substantially equal. The first string 620 and the second string 630 may be driven or powered by a first power management integrated circuit or other driver chip.

The driving circuit 600 may include a second set 640 of one or more strings that have LEDs of a second color. The second color may be different than the first color. For example, the second color may be amber white, and the first color may be cool white. The second set 640 may include, in one example, two independent strings that have amber white LEDs. A first string 650 in the second set 640 may include six amber white LEDs connected in a series connection. A second string 660 in the second set 640 may include seven amber white LEDs connected in a partially parallel partially series connection. For example, a first LED 670 in the second string 660 and a second LED 680 in the second string 660 may be connected in a parallel connection. The first string 650 may be separate or independent from the second string 660. The remaining five LEDs 690 may be in a series connection with both the first LED 670 and the second LED 680.

Each of the five LEDs 690 may be powered with the same amount of current, which may be the same amount of current provided to the LEDs of the first set 610 of LEDs. The first LED 670 and the second LED 680 in the second string 660 of the second set 640, however, may receive or be powered with a different amount of current. For example, the first LED 670 and the second LED 680 may be powered with half or about half of the amount of current provided to the five LEDs 690. As a result, the second string 660 has seven LEDs, but uses six LEDs worth of power, or an amount of current that is used to power six LEDs is used to power seven LEDs for the second string 660, due to the configuration of the driving circuit 600. The first LED 670 and the second LED 680 may correspond to array edges, and may have reduced current so as to avoid shining or providing too much light at an edge of the array. Any number of LEDs may be included.

The first string 650 and the second string 660 may be driven or powered by a second power management integrated circuit or other driver chip. The driving circuit may therefore be driven by two independent driver circuits in some embodiments. Other embodiments may use a single circuit or multiple circuits. While discussed in these examples in the context of five, six, and/or seven LEDs, any number of LEDs may be used. In some embodiments, the first LED 670 and the second LED 680 may be wired between any two LEDs in the second set 640. While FIG. 6 depicts a certain current direction, other embodiments may reverse or modify a direction of current.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
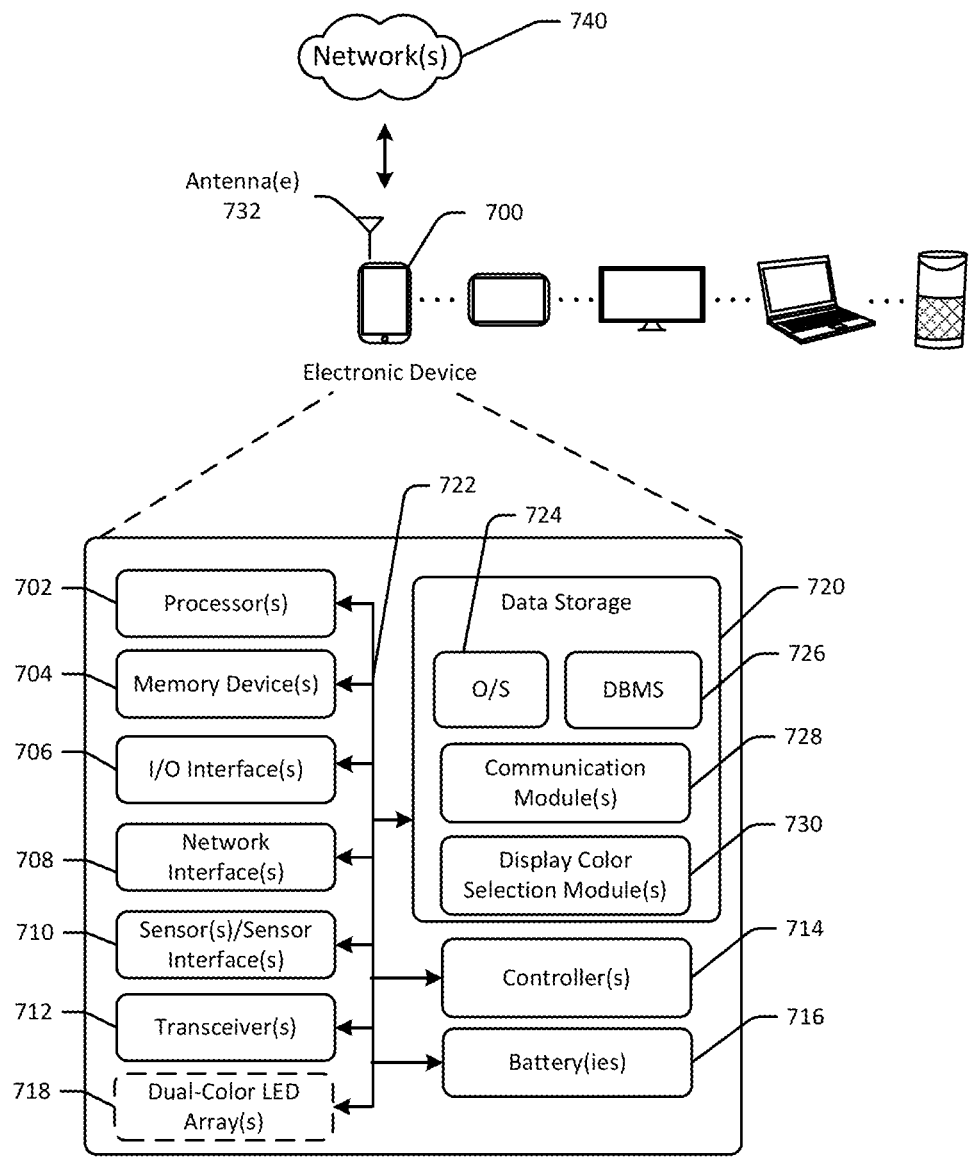
FIG. 7 schematically illustrates an example architecture of an electronic device in accordance with one or more embodiments of the disclosure.

FIG. 7 is a schematic block diagram of one or more illustrative electronic device(s) 700 in accordance with one or more example embodiments of the disclosure. The electronic device(s) 700 may include any suitable computing device including, but not limited to, a server system, a camera or camera system, a mobile device such as a smartphone, a tablet, an e-reader, a wearable device, a speaker device, or the like; a desktop computer; a laptop computer; a content streaming device; a set-top box; or the like. The electronic device(s) 700 may correspond to an illustrative device configuration for the electronic device(s) of FIGS. 1-6.

The electronic device(s) 700 may be configured to communicate via one or more networks with one or more servers, user devices, or the like. The electronic device(s) 700 may have a battery that is configured to prevent swelling or other damage, which may prevent damage to the electronic device(s) 700. The electronic device(s) 700 may be configured to select one or more wireless communication protocols, and control operations of remote devices, such an internet of things devices, and other operations.

The electronic device(s) 700 may be configured to communicate via one or more networks 740. Such network(s) 740 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 740 may have any suitable communication range associated therewith and may include, for example, global networks (e.g., the Internet), metropolitan area networks (MANs), wide area networks (WANs), local area networks (LANs), or personal area networks (PANs). In addition, such network(s) 740 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 700 may include one or more processors (processor(s)) 702, one or more memory devices 704 (generically referred to in this section as memory 704), one or more input/output (I/O) interfaces 706, one or more network interfaces 708, one or more sensors or sensor interfaces 710, one or more transceivers 712, one or more controllers 714, one or more batteries 716, one or more optional dual-color LED array(s) 718, and data storage 720. The electronic device(s) 700 may further include one or more buses 722 that functionally couple various components of the electronic device(s) 700. The electronic device(s) 700 may optionally include one or more antenna(e) 732 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 722 may include at least one of a system bus, a memory bus, an address bus, or a message bus, and may permit the exchange of information (e.g., data (including computer-executable code), signaling, etc.) between various components of the electronic device(s) 700. The bus(es) 722 may include, without limitation, a memory bus or a memory controller, a peripheral bus, an accelerated graphics port, and so forth. The bus(es) 722 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the electronic device(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 724; one or more database management systems (DBMS) 726; and one or more program module(s), applications, engines, computer-executable code, scripts, or the like such as, for example, one or more communication module(s) 728 and/or one or more display color selection module(s) 730. Some or all of these module(s) may be or include sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support the functionality described in reference to the corresponding components named earlier in this disclosure.

The data storage 720 may further store various types of data utilized by the components of the electronic device(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 726 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) may include, for example, user account or user profile data, user device or battery settings, user device preferences and authorizations, and other information.

The processor(s) 702 may be configured to access the memory 704 and execute the computer-executable instructions loaded therein. For example, the processor(s) 702 may be configured to execute computer-executable instructions of the various program module(s), applications, engines, or the like of the electronic device(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the communication module(s) 728 may include computer-executable instructions, code, or the like that responsive to execution by one or more of the processor(s) 702 may perform functions including, but not limited to, communicating with remote servers or devices, communicating with remote datastores, communicating with local servers or devices on an intranet, sending or receiving information and instructions, sending or receiving orders, and the like.

The display color selection module(s) 730 may include computer-executable instructions, code, or the like that are responsive to execution by one or more of the processor(s) 702 may perform functions including, but not limited to, determining an LED color to activate, determining one or more LED colors to use, controlling operation of one or more LEDs or LED arrays, and the like.

Referring now to other illustrative components depicted as being stored in the data storage 720, the O/S 724 may be loaded from the data storage 720 into the memory 704 and may provide an interface between other application software executing on the electronic device(s) 700 and the hardware resources of the electronic device(s) 700. More specifically, the O/S 724 may include a set of computer-executable instructions for managing the hardware resources of the electronic device(s) 700 and for providing common services to other application programs (e.g., managing memory allocation among various application programs). In certain example embodiments, the O/S 724 may control execution of the other program module(s) to dynamically enhance characters for content rendering. The O/S 724 may include any operating system now known or which may be developed in the future including, but not limited to, any server operating system, any mainframe operating system, or any other proprietary or non-proprietary operating system.

The DBMS 726 may be loaded into the memory 704 and may support functionality for accessing, retrieving, storing, and/or manipulating data stored in the memory 704 and/or data stored in the data storage 720. The DBMS 726 may use any of a variety of database models (e.g., relational model, object model, etc.) and may support any of a variety of query languages. The DBMS 726 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 700 is a mobile device, the DBMS 726 may be any suitable light-weight DBMS optimized for performance on a mobile device.

Referring now to other illustrative components of the electronic device(s) 700, the input/output (I/O) interface(s) 706 may facilitate the receipt of input information by the electronic device(s) 700 from one or more I/O devices as well as the output of information from the electronic device(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), micro-USB, FireWire, Thunderbolt, Ethernet port or other connection protocol that may connect to one or more networks. The I/O interface(s) 706 may also include a connection to one or more of the antenna(e) 732 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 700 may further include one or more network interface(s) 708 via which the electronic device(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The optional antenna(e) 732 may include any suitable type of antenna depending, for example, on the communications protocols used to transmit or receive signals via the antenna(e) 732. Non-limiting examples of suitable antennae may include directional antennae, non-directional antennae, dipole antennae, folded dipole antennae, patch antennae, multiple-input multiple-output (MIMO) antennae, or the like. The antenna(e) 732 may be communicatively coupled to one or more transceivers 712 or radio components to which or from which signals may be transmitted or received.

As previously described, the antenna(e) 732 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 732 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 732 may be configured to transmit or receive radio frequency signals within any suitable frequency range forming part of the unlicensed portion of the radio spectrum.

The antenna(e) 732 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 732—transmitting or receiving radio frequency (RF) signals in the bandwidth and/or channels corresponding to the communications protocols utilized by the electronic device(s) 700 to communicate with other devices. The transceiver(s) 712 may include hardware, software, and/or firmware for modulating, transmitting, or receiving—potentially in cooperation with any of antenna(e) 732—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the electronic device(s) 700. The transceiver(s) 712 may further include a low noise amplifier (LNA), additional power signal amplifiers (PA), an analog-to-digital (A/D) converter, one or more buffers, a digital baseband, or the like.

The controller(s) 714 may be any microcontroller or microprocessor configured to control one or more operations of the electronic device(s) 700. The battery(ies) 716 may be a swelling resistant pouch battery configured to power the electronic device(s) 700. For example, the battery 716 may be a lithium-ion battery. The battery 716 may be coupled to the one or more optional dual-color LED array(s) 718. The one or more optional dual-color LED array(s) 718 may include one or more LED colors, such as amber colored LEDs, cool white LEDs, and other LED colors, and may include LEDs having a specific arrangement, such as an alternating arrangement, a separated arrangement, or another arrangement.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 7 as being stored in the data storage 720 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 700, and/or hosted on other computing device(s) accessible via one or more networks, may be provided to support the functionality provided by the program module(s), applications, or computer-executable code depicted in FIG. 7 and/or additional or alternate functionality. Further, functionality may be modularized differently such that processing is described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the electronic device(s) 700 may include alternate and/or additional hardware, software, or firmware components beyond those described or depicted without departing from the scope of the disclosure. More particularly, it should be appreciated that software, firmware, or hardware components depicted as forming part of the electronic device(s) 700 are merely illustrative and that some components may not be present or additional components may be provided in various embodiments. While various illustrative program module(s) have been depicted and described as software module(s) stored in the data storage 720, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A device comprising: a first LED;
a second LED; and
a light guide comprising an incident surface and a emission surface, wherein the emission surface comprising a first portion, a second portion, and a third portion, wherein the first portion comprises first binary elements oriented along light emitted from the first LED, the second portion comprises second binary elements oriented along light emitted from the second LED, and the third portion disposed to receive light that propagates through at least one of the first region or the second region and comprises a plurality of cylindrical elements;
wherein the first binary elements are substantially perpendicular to the second binary elements, and wherein the first binary elements and the second binary elements comprise rectangular geometries.

2. The device of claim 1, wherein the first portion is a first pixel and the second portion is adjacent to the first pixel.

3. The device of claim 2, wherein the second portion is part of a second pixel.

4. The device of claim 1, wherein the first LED emits light having a first color and the second LED emits light having a second color.

5. The device of claim 4, further comprising a third LED that emits light having the first color and a fourth LED that emits light having the second color;
wherein the second LED is positioned between the first LED and the third LED; and
wherein the first color is an amber white color and the second color is a cool white color.

6. A device comprising:
a dual-color LED array comprising a first set of LEDs and a second set of LEDs, wherein the first set of LEDs and the second set of LEDs are arranged in an alternating arrangement; and
a light guide optically coupled to the dual-color LED array at an edge surface of the light guide, the light guide comprising an incident surface and a emission surface, wherein the emission surface comprising a first set of raised protrusions formed on a first portion of a surface of the light guide, and a second set of raised protrusions formed on a second portion of the surface of the light guide;

wherein the first set of raised protrusions are arranged adjacent to a first LED of the first set of LEDs, wherein the first set of raised protrusions and the second set of raised protrusions comprise rectangular geometries;

wherein the light guide further comprises a first set of raised cylindrical protrusions formed on a third portion of the light guide, wherein the first portion is disposed between the dual-color LED array and the third portion.

7. The device of claim 6, wherein first set of raised protrusions are arranged adjacent to a first LED of the first set of LEDs and the second set of raised protrusions are arranged adjacent to a second LED of the second set of LEDs, and wherein the second set of raised protrusions are positioned parallel to a second direction of light emitted from the first LED.

8. The device of claim 6, further comprising:
a driving circuit configured to direct current to the first set of LEDs, wherein the driving circuit is configured to direct a first amount of current to the first LED in the first set of LEDs, the first amount of current to a third LED in the first set of LEDs, and a second amount of current to a fourth LED in the first set of LEDs;
wherein the third LED is in a parallel connection with the first LED, and the fourth LED is in a series connection with both the first LED and the third LED; and
wherein the first amount of current is about half of the second amount of current.

9. A device comprising:
a first set of LEDs;
a second set of LEDs; and
a light guide comprising an incident surface and a emission surface, wherein the emission surface comprising a first portion, and a second portion, and a third portion, wherein the first portion comprises first binary elements oriented along light emitted from the first set of LEDs, and the second portion comprises second binary elements oriented along light emitted from the second set of LEDs, and the third portion comprises a plurality of cylindrical dot features, wherein the first binary elements form an obtuse angle with respect to the second binary elements, and wherein the first binary elements and the second binary elements comprise rectangular geometries, and wherein the first portion is disposed between the first set of LEDs and the third portion.

10. The device of claim 9, wherein the first set of LEDs emit light having a first color, and the second set of LEDs emit light having a second color.

11. The device of claim 9, wherein the first portion is a first pixel, and wherein the second portion is part of a second pixel that is adjacent to the first pixel.

12. The device of claim 1, further comprising a blended region disposed between the first region and the third region, wherein the blended region comprises cylindrical dot features and first binary elements.

13. The device of claim 12, wherein a density of first binary elements decreases from the first LED to the blended region.

14. The device of claim 12, wherein a density of cylindrical dot features decreases from the blended region to a distal end of the light guide.

15. The device of claim 6, further comprising a blended portion disposed between the first portion and the third portion, wherein the blended region comprises raised cylindrical protrusions and first set of raised protrusions.

16. The device of claim 9, further comprising a blended portion disposed between the first portion and the third portion, wherein the blended region comprises cylindrical dot features and first binary elements.

* * * * *